Patented Nov. 25, 1941

2,263,594

UNITED STATES PATENT OFFICE 2,263,594

MAKING CUPRIC META-ARSENITE

Eugene R. Rushton, Florence, Ala.

No Drawing. Application August 3, 1940,
Serial No. 351,258

8 Claims. (Cl. 23—53)

(Granted under the act of March 3, 1883, as
amended April 30, 1928; 370 O. G. 757)

The invention herein described may be manufactured and used by or for the Government for governmental purposes without the payment to me of any royalty thereon.

This invention relates to the art of making arsenical larvicides, particularly cupric meta-arsenite.

A number of processes have been proposed for the manufacture of copper arsenate and copper arsenite for use in various types of insect control. However, the materials so produced invariably contained a mixture of substantial proportions of both the arsenate and arsenite. It is now recognized that arsenites are much more effective than arsenates, insofar as the control of pests is concerned.

The principal object of this invention is to produce a commercial larvicide consisting of cupric meta-arsenite with a relatively high degree of purity. Another object of this invention is to produce such a material from the most readily available raw materials, namely, metallic copper and arsenic trioxide. Still another object of this invention is to provide for a method of producing a copper solution suitable for the preparation of cupric meta-arsenite therefrom. Other objects of this invention include the provision of a rapid and economical method for the production of cupric meta-arsenite.

I have discovered a process of making cupric meta-arsenite by adding arsenic trioxide to a substantially neutral ammonium chloride solution containing dissolved copper, by boiling and aerating the ammonium chloride solution containing dissolved copper and the arsenic trioxide suspended therein for a sufficient length of time to convert all of said arsenic trioxide to solid cupric meta-arsenite with the addition of sufficient ammonia withdrawn from said solution during said aeration, and by separating said cupric meta-arsenite from the solution with which it is associated.

One example of the operation of my process is given for the production of cupric meta-arsenite from metallic copper and arsenic trioxide. A portion of a mass of metallic copper with an extended surface was dissolved in an ammonium chloride solution containing 10 grams $NH_4Cl$ in each 100 ml. of solution with boiling and aeration of the solution for a period of one hour. Ammonia was added to the solution from time to time in an amount sufficient to replace that lost in the boiling and aeration and to maintain the solution substantially neutral. The ammonium chloride solution containing 4.35 grams of dissolved copper in each 100 ml. of solution was separated from the undissolved copper and an amount of arsenic trioxide corresponding to 10 grams of $As_2O_3$ for each 100 ml. of solution was added thereto. This mixture was boiled and aerated for one hour and again a sufficient amount of ammonia was added from time to time to replace that lost from the solution. The solid cupric meta-arsenite which was formed was separated from the solution and upon analysis was found to contain 71.5% by weight of $As_2O_3$. This corresponds to 71.4% by weight of $As_2O_3$ as the theoretical percentage in cupric meta-arsenite $Cu(AsO_2)_2$. The subsequent small scale tests for larvicidal power against *Anopheles quadrimaculatus* larvae gave a Paris green coefficient of 1.12. The Paris green coefficient is defined as the ratio of the percent of larvae killed by the larvicide under test to the amount killed by a standard sample of Paris green under the same test conditions.

It is evident that there are numerous factors which will influence conditions for the most satisfactory operation of this invention, the actual limits of which cannot be established except by a detailed consideration of the intermediate and finished products involved.

The present invention contemplates two major steps, namely, the preparation of a suitable solution of copper and the reaction between such copper solution and arsenic trioxide to form the cupric meta-arsenite.

Early in the study of this problem it was discovered that a copper arsenite prepared by the use of a cuprous chloride solution was the only one which was superior to Paris green in larvicidal value. It was found that a more satisfactory solution for the purpose of this invention could be obtained by dissolving metallic copper in an ammonium chloride solution which was boiled and aerated. Both the amount of copper which may be dissolved and the rate of solution of the copper is generally proportional to the concentration of ammonium chloride in the solution used. Although various concentrations of ammonium chloride solutions may be used, one containing 10 grams $NH_4Cl$ in each 100 ml. has been found to be particularly suitable for this purpose. In order that the ammonium chloride solution containing dissolved copper be maintained substantially neutral it is necessary to add ammonia from time to time since some of the ammonia present in the solution is lost during the boiling and aeration. The amounts of copper present in the solution may vary over a considerable range, such as up to approximately 5.0 grams in each 100 ml. of solution. Solutions containing copper of the order of 3 to 3.5 grams in each 100 ml. of solution have been found to function satisfactorily in the subsequent reaction with arsenic trioxide.

After the concentration of copper in the ammonium chloride solution has reached a predetermined amount, the solution is separated from the undissolved metallic copper. In some instances it is desirable to continue the aeration of the solution so separated in order to insure the maximum oxidation of the copper present.

The arsenic trioxide used is preferably finely divided. Material containing approximately 99% $As_2O_3$ with 75% passing through a 200 mesh screen has been used satisfactorily in the present process. The amount of finely divided solid arsenic trioxide used is primarily a function of the amount of copper present in the ammonium chloride solution containing dissolved copper. Cupric meta-arsenite of desired properties has been most satisfactorily produced when the mol ratio of arsenic trioxide to copper is maintained in the order of 1 to 1. However, with this ratio controlled so that the products contain 68.5 to 77.4% $As_2O_3$ (as compared with the 71.4% $As_2O_3$ for pure cupric meta-arsenite) all were found to have high larvicidal values as indicated by Paris green coefficients of $1.10 \pm 0.04$ for 16 products within this range.

The mixture of solid arsenic trioxide and the ammonium chloride solution containing dissolved copper is boiled and aerated for a sufficient length of time to convert substantially all of the arsenic trioxide to cupric meta-arsenite. This time may vary somewhat, depending upon such factors as the fineness of the arsenic trioxide, the type of apparatus used, and the extent of agitation. In discontinuous operation a period of one hour has been found to be sufficient for this purpose. As in the case with the solution of copper in the ammonium chloride, it is necessary to add ammonia from time to time in order to replace losses caused by boiling and aeration. After the formation of the cupric meta-arsenite is completed this finely divided solid arsenite is separated from the solution with which it is associated. The solution from which the arsenite is separated may then be used over again by contacting it with metallic copper to form a further ammonium chloride solution containing dissolved copper.

The ammonia which is removed during boiling and aeration, both in the step of dissolving copper and the step wherein a cupric meta-arsenite is formed, is recovered and returned to the process.

It will be seen, therefore, that this invention actually may be carried out without departing from its spirit and scope, with only such limitations placed thereon as may be imposed by the prior art.

I claim:

1. A process of making cupric meta-arsenite which comprises (a) dissolving metallic copper in a boiling solution of ammonium chloride, while aerating the solution and maintaining the solution substantially neutral by adding sufficient ammonia to replace the ammonia withdrawn during boiling and aeration, (b) separating the solution so formed from the metallic copper remaining undissolved, (c) adding arsenic trioxide to the solution so separated, (d) boiling and aerating the ammonium chloride solution containing dissolved copper and the arsenic trioxide suspended therein for a sufficient length of time to convert all of said arsenic trioxide to solid cupric meta-arsenite with the addition of sufficient ammonia to replace the ammonia withdrawn from said solution during said aeration and boiling, and (e) separating said cupric meta-arsenite from the solution with which it is associated.

2. The process according to claim 1 wherein (a) said ammonium chloride solution contains an amount of ammonium chloride of the order of 10 grams per 100 ml. of solution.

3. The process according to claim 1 wherein (a) the amount of arsenic trioxide used corresponds to the amount of copper in the ammonium chloride solution containing dissolved copper in a mol ratio of the order of 1 to 1.

4. The process according to claim 1 wherein (a) the ammonium chloride solution containing dissolved copper contains an amount of copper of the order of 3 to 3.5 grams per 100 ml. of solution, and (b) the amount of arsenic trioxide used corresponds in amount to the order of 10 grams per 100 ml. of said ammonium chloride solution containing dissolved copper to which it is added.

5. The process according to claim 1 wherein (a) in the cyclic operation of the process the metallic copper is treated with the solution which is separated from the cupric meta-arsenite.

6. A process of making cupric meta-arsenite which comprises (a) adding arsenic trioxide to a substantially neutral ammonium chloride solution containing dissolved copper, (b) boiling and aerating the ammonium chloride solution containing dissolved copper and the arsenic trioxide suspended therein for a sufficient length of time to convert all of said arsenic trioxide to solid cupric meta-arsenite with the addition of sufficient ammonia to replace the ammonia withdrawn from said solution during said aeration and boiling, and (c) separating said cupric meta-arsenite from the solution with which it is associated.

7. The process according to claim 6 wherein (a) the amount of arsenic trioxide used corresponds to the amount of copper in the ammonium chloride solution containing dissolved copper in a mol ratio of the order of 1 to 1.

8. The process according to claim 6 wherein (a) the ammonium chloride solution containing dissolved copper contains an amount of copper of the order of 3 to 3.5 grams per 100 ml. of solution, and (b) the amount of arsenic trioxide used corresponds in amount to the order of 10 grams per 100 ml. of said ammonium chloride solution containing dissolved copper to which it is added.

EUGENE R. RUSHTON.